Dec. 27, 1960 F. A. KROHM 2,965,915
WINDSHIELD WIPER BLADE ASSEMBLY
Original Filed Sept. 14, 1954 2 Sheets-Sheet 1

INVENTOR.
FRED A. KROHM
BY
Charles S. Penfold
ATTORNEY

Dec. 27, 1960 F. A. KROHM 2,965,915
WINDSHIELD WIPER BLADE ASSEMBLY
Original Filed Sept. 14, 1954 2 Sheets-Sheet 2

INVENTOR.
FRED A. KROHM
BY
Charles N. Penfold
ATTORNEY

United States Patent Office 2,965,915
Patented Dec. 27, 1960

1

2,965,915
WINDSHIELD WIPER BLADE ASSEMBLY

Fred A. Krohm, Hobart, Ind., assignor to The Anderson Company, a corporation of Indiana Continuation of abandoned application Ser. No. 455,981, Sept. 14, 1954. This application Oct. 14, 1959, Ser. No. 846,331

23 Claims. (Cl. 15—250.32)

This invention relates generally to windshield wiper apparatus and more particularly is directed to a connector for establishing a detachable connection between a windshield wiper arm unit and a wiper blade unit.

This application is a continuation of my copending application Serial No. 455,981, filed September 14, 1954.

One of the principal objects of the invention is to provide a connector primarily adapted for support on a wiper blade unit and which is so designed and constructed that any one of different types or forms of wiper arm units can be readily attached to the connector. More specifically an object of the invention is to provide a connector with abutment means and yieldable locking means operatively related thereto in a manner to detachably hold an arm unit in relation thereto.

An important object of the invention is to provide a wiper blade comprising a resilient wiping element, a support therefor, an elongate mounting or bridge having its extremities resiliently mounted on the wiping element, and a connector of the character above referred to carried by the mounting.

A specific object of the invention is to provide the mounting above referred to with a seat or pocket and locate the yieldable locking means substantially between the seat and the abutment means so that it can be utilized to detachably hold one type of arm unit in relation to the seat or an arm unit of a different type in relation to the abutment means.

A further object of the invention is to provide a locking means comprising, among other things, a slidable member provided with a lockng portion for one type of a wiper arm unit and a fitting carried by the slidable member for holding another type of arm unit in relation to the abutment means.

Another object of the invention is to provide a connector channel having side walls with continuations which cooperate with the mounting to impart rigidity thereto.

A particular object of the invention is to provide the side walls of the connector channel with means whereby the channel can be snapped into connection with the mounting.

An additional object of the invention is to provide an adapter which is attached to the connector in a unique manner.

Other objects and attributes of the invention will become apparent after the description hereinafter set forth is considered in conjunction with the drawing annexed hereto.

2

Figure 5:
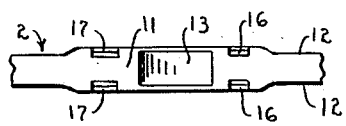
Figure 6:
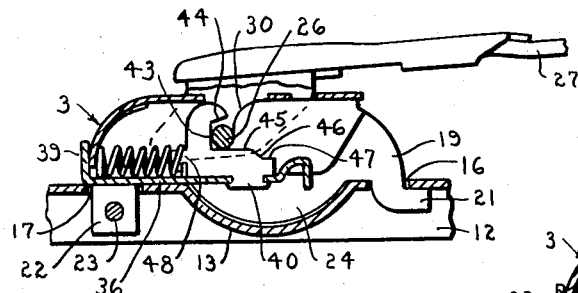
Figure 7:
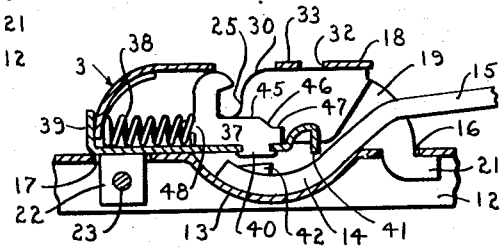
Figure 8:
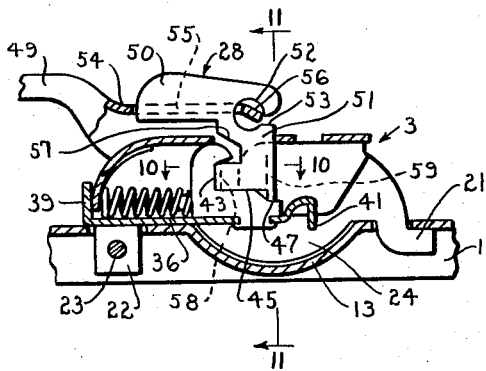
Figure 9:
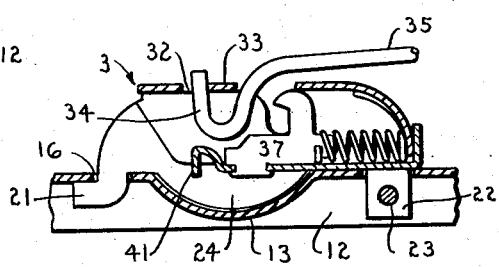
Figure 10:
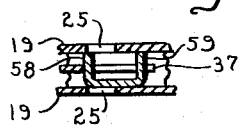
Figure 11:
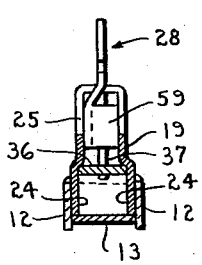
Figure 12:
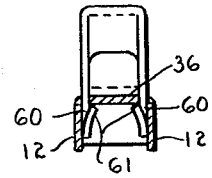

Figure 5 is a top view of the bridge with the connector removed therefrom;

Figure 6 is an enlarged partial elevational view, with portions in section, depicting the structural characteristics of the bridge, connector and one type of a wiper arm unit;

Figure 7 is a view similar to Figure 6 showing a different type or form of wiper arm unit operatively associated with the connector and bridge;

Figure 8 is a view similar to Figures 6 and 7 illustrating an adapter that is detachably connected to a different type of wiper arm unit operatively associated with the connector on the bridge of the wiper arm assembly;

Figure 9 is a view similar to Figure 8 and illustrates a different form of arm unit that may be attached to the connector;

Figure 10 is a transverse section taken substantially on line 10—10 of Figure 8 showing certain details of the adapter;

Figure 11 is a transverse section taken substantially on line 11—11 of Figure 8; and Figure 12 exemplifies a modified form of construction whereby one extremity of a part of the connector channel may be secured to the bridge or mounting by snap-connection means.

Figure 1:
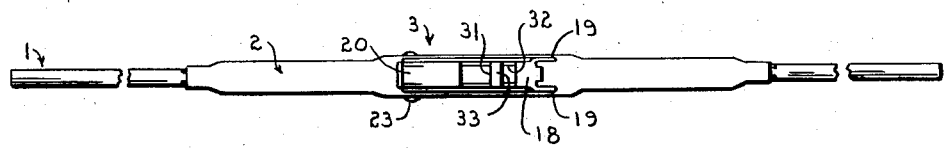
Figure 1 is a top view of a windshield wiper blade assembly.
Figure 2:
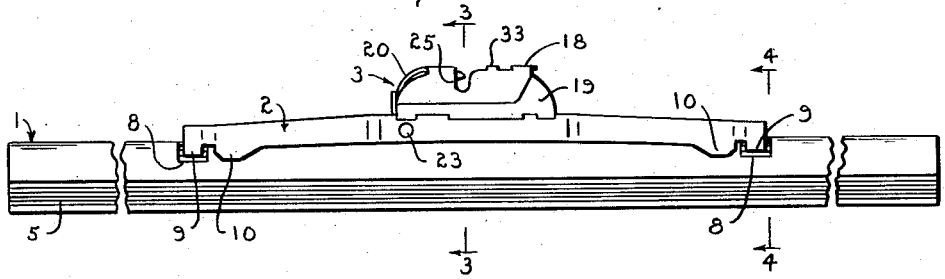
Figure 2 is a side view in elevation of the wiper assembly illustrated in Figure 1.

Referring to Figures 1 and 2 of the drawing, the blade assembly includes a blade unit generally designated 1, a mounting preferably in the form of a bridge 2 having its ends operatively connected to the blade unit and a connector 3 carried by the bridge for selectively connecting the assembly to different types of wiper arms.

Figure 3:
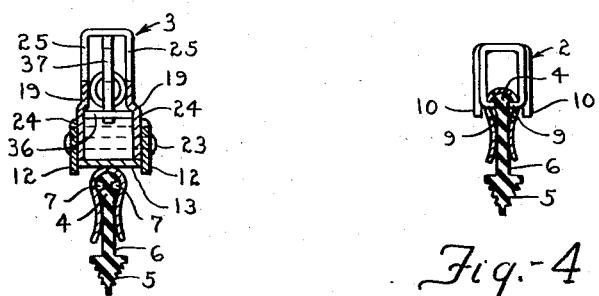
Figure 3 is an enlarged transverse sectional view taken substantially on line 3—3 of Figure 2.
Figure 4:
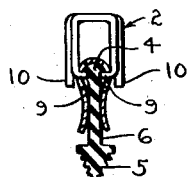
Figure 4 is an enlarged transverse sectional view taken substantially on line 4—4 of Figure 2.

The blade unit, as shown in Figures 1, 3 and 4, consists of an elongate wiping element having an attaching portion 4 secured within a rigid channel back support and a wiping portion 5 joined to the attaching portion by a neck 6. The opposite sides of the attaching portion are provided with corresponding longitudinally extending exterior grooves 7 as shown in Figure 3, and the support as shown in Figures 2 and 4 has two pairs of longitudinally spaced opposed generally rectangular side openings 8 which provide access to the attaching portion of the wiping element. The bridge 2 is preferably made in the form of an elongate channel and its central portion is preferably formed to provide an enlargement which supports the connector. The bridge is also provided with formations adjacent its ends and each formation has side walls provided with inturned projections 9 which extend through the pairs of openings 8 in the support and seat in the exterior grooves 7 in the attaching portion of the wiping element as shown in Figure 4 whereby to resiliently support the bridge on the element to provide a rockable connection between the bridge and the blade unit.

The side walls of the bridge are also preferably provided with pairs of abutments or ears 10 adjacent the formations which carry the fingers 9. These abutments straddle the blade unit and serve to control the range of rockable or pivotal movement between the bridge and blade unit.

The central enlargement of the bridge as shown in Figures 5 and 7 includes an outer base wall 11 and side walls 12 which extend toward the blade unit. This enlargement is preferably cut for short distances along the junction lines between its base wall and side walls so that a portion of the base wall can be pressed inwardly between the side walls to form an inturned curved seat 13 for the curved entering part 14 of a wiper arm 15 as shown in Figure 7. The base wall of the enlargement is further provided with a pair of slots 16 located at one side of the curved seat 13 and another pair of longer slots 17 located on the other side of the seat.

The connector includes a channel having an outer wall 18, side walls 19, and a curved end wall 20 which substantially closes one end of the channel. The other end of the channel is open in order to permit entry of the curved entering arm part 14 into the connector for slidable engagement with the curved seat 13. The side walls of the channel adjacent its open end are provided with a pair of integral corresponding offset or L-shaped fingers 21 which project through the slots 16 and bear against the inner surface of the base wall 11 of the enlargement and the side walls adjacent the end wall 20 are provided with a pair of corresponding lugs 22 which project through the slots 17 so that a rivet 23 can be extended through the side walls of the enlargement and through the lugs to permanently secure the channel part of the connector to the bridge. Attention is directed to the fact that the side walls of the channel part of the connector are also provided with generally semicircular continuations 24 which bear against the inner surfaces of the side walls 12 as shown in Figures 3 and 6. The distance between the continuations is such that they offer guidance to the curved entering part 14. Due to the offset character of the fingers 21 the channel of the connector is first held at an angle during assembly of the parts so as to permit entry of the fingers into the slots 16 after which the channel is moved directly against the enlargement and over the curved seat.

The side walls 19 of the channel of the connector are provided with corresponding recesses 25 which cooperate to provide an opening constituting abutment means. The opening is formed to receive an entering part in the form of a cross pin 26 carried by the side walls of an attachment fixed on a wiper arm 27 of the type illustrated in Figure 6, and also for the purpose of receiving an adapter generally designated 28 of the character illustrated in Figures 8, 10 and 11 which will be described more in detail subsequently. It is to be noted that certain of the marginal edges defining the recesses 25 in the side walls of the channel are curved as indicated at 30 so as to facilitate entry of the cross pin and the adapter, and that the base of each recess is preferably arcuate so as to better accommodate the cross pin.

The outer wall of the channel is provided with a clearance aperture which permits entry of the cross pin and/or adapter into the opening formed by the recesses 25. An edge 31 of the outer base wall constitutes a marginal edge defining a part of the clearance aperture. The base wall is further provided with an opening 32 and this opening is spaced from the clearance aperture so as to form a bridge 33. The clearance aperture and opening 32 are so located that the hooked entering part 34 of a wiper arm 35 may be inserted through the aperture and opening to receive the bridge 33 in order to provide a connection between the arm and wiper blade assembly as shown in Figure 9.

A yieldable locking subassembly is operatively associated with the channel of the connector and this subassembly includes an elongate member 36 which slides or reciprocates between the side walls of the channel for guidance, a fitting 37 secured to the slidable member, and a helical spring 38 which serves to urge the member and fitting as a unit in a predetermined direction toward the open end of the channel. It will be noted that portions of the side walls of the channel of the connector are inset and form longitudinally extending shoulders which are spaced from the bottom wall of the enlargement of the bridge so as to form relatively narrow recesses for slidably receiving the longitudinal marginal edge portions of the slidable member as shown in Figure 11.

The slidable member is preferably made in the form of a generally rectangular plate having an upturned end 39 constituting a handle and serving as a stop to limit inward movement of the slidable member and fitting carried thereby. The slidable member is provided with a centrally disposed longitudinal slot and the fitting is provided with a projection 40 which extends through the slot and is flanged over or upset to secure the fitting in an erect position with respect to the plane of the slidable member. The inner end of the slidable member is provided with an upturned offset which is provided with a downturned abutment 41 constituting a locking component which is adapted to cooperate with an abutment 42 formed on the curved entering part 14 of the arm 15 shown in Figure 7 to prevent accidental disconnection of the blade assembly from the arm. The relationship of the various parts is such that the abutment 42 on the entering part 14 will cam or move the slidable member and fitting out of the way and compress the spring 38 until the abutment 42 clears the abutment 41, whereupon the slidable member and fitting as a unit snap back to their original locking position.

The fitting 37 is generally L-shaped and planar. It is notched to receive the cross pin 26 on the wiper arm 27 above referred to as well as the adapter 28. More particularly the notch is defined by marginal edges 43, 44 and 45. The notch serves to form a hook or latch constituting a locking component. It will be noted that the upper part of the fitting is rounded or noselike and is located with respect to the curved marginal edges 30 of the recesses 25 in the channel of the connector to more or less form a V which assists in piloting the cross pin and adapter into the connector. In other words, the arrangement is such that when the cross pin is pressed against the nose part of the fitting the fitting will be retracted and when the cross pin is properly seated in the opening defined by the recesses 25 the helical spring 38 will cause the fitting and slidable member as a unit to move to its normal locking position as shown in Figure 6 to lock the pin in place. To release the pin it is merely necessary to grasp the handle 39 and pull outwardly to release the latch from the pin so that the pin can be readily removed from the opening. It will be noted that the fitting is further provided with a clearance interruption defined by angularly disposed marginal edges 46 and 47 and that the fitting has a tang 48 which receives one end of the helical spring 38. The other end of the spring bears against the inner surface of the end wall 20 of the channel.

Referring to Figures 8, 10 and 11 of the drawing, the adapter 28 is shown detachably connected to an arm 49 and the connector on the blade assembly. More specifically, the adapter is generally L-shaped to include a flat leg 50 and an offset leg 51. The junction between the legs is provided with a round aperture 52 and an entrance slot 53 intersecting the aperture. The wiper arm 49 is provided with a channel part having side walls and a base wall 54 provided with a slot 55. The adapter is assembled with the channel part of the arm in a well-known manner so that the aperture receives a portion 56 on the channel part and with the flat leg 50 disposed in the slot 55. The offset leg is formed to provide a notch 57 and a pair of lateral parallel abutments 58 and 59 as shown in Figures 10 and 11. When the adapter is assembled with the connector, the leg 51 will be disposed in the connector with a marginal side edge of the leg engaging the edge 31 on the outer wall of the channel and the lower edge of the leg engaging the marginal edges 45 of the fitting. The abutment 58 which is smaller than the abutment 59 will be disposed in the notch of the fitting so as to engage the marginal edges 43, 44 and 45 thereof, so that the lower edge of the abutment 59 will bear against the marginal edge 47, and so that the nose of the fitting is received in the notch 57 of the leg 51. The adapter can be readily detached from the connector by merely manipulating the slidable member 36 so that the fitting will free the adapter from the connector.

As clearly shown in Figure 12, if found desirable, the channel of the connector can be formed with lugs 60 provided with yieldable tongues 61 for locking one end of the channel to the bridge in lieu of the lugs and rivet above referred to. With the structure in Figure 12, it is only necessary to insert the lugs into the slots to a predetermined position, whereupon the tongues snap inwardly and engage the undersurface of the bridge to lock the channel in place. If found desirable, additional corresponding lugs may be provided on the channel, constituting a housing, in lieu of the fingers, so as to snap-connect both ends of the channel to the bridge. Also the lugs could be bent to produce locking connections in place of the snap connections.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A device of the kind described comprising a mounting provided with a seat, a channel having side walls secured to the mounting and also having an outer wall joining the side walls, abutment means provided on the side walls, a member movable lengthwise between the side walls and provided with a pair of locking components, one of said components serving to detachably hold an entering part on the seat, and the other component serving to detachably hold a different entering part in relation to the abutment means after the entering part on the seat is removed.

2. A device of the kind described comprising a mounting provided with an outer wall and side walls, said outer wall being formed with a portion inturned between the side walls to provide a rigid seat for slidably receiving an entering part, and means carried by the mounting for detachably holding such a part in the seat.

3. A device of the kind described comprising a mounting provided with an outer wall and side walls, said outer wall being formed with a portion inturned between the side walls to provide a curved rigid seat for slidably receiving an entering part, and means carried by the mounting for detachably holding such a part in the seat.

4. A connector of the kind described comprising a channel having side walls, abutment means provided on the side walls, a member movable between said side walls and provided with a pair of rigid locking components, one of said components serving to detachably hold one type of an entering part in relation to the abutment means and the other component serving to detachably hold a different type of an entering part in relation to a mounting for the connector after the first-mentioned entering part is removed from the abutment means.

5. A device of the kind described comprising a mounting having side walls and an outer wall, said outer wall having a portion inturned between the side walls to provide a curved seat, a channel having side walls secured to the mounting with portions of the side walls disposed between the side walls of the mounting and along the sides of the seat for straddling a curved entering part insertable through one end of the channel into the seat, a manually operable member slidable in the channel and provided with a locking component for detachably holding such an entering part in the seat, and resilient means acting on the slidable member for normally maintaining the member in a locking position.

6. A device of the kind described comprising a mounting having side walls and an outer wall joining the side walls, said outer wall having a curved portion disposed between the side walls to provide a seat, a housing having side walls secured to the mounting and provided with recesses, and a member movable between the side walls of the housing and provided with a pair of locking components located substantially between and respectively adjacent the seat and recesses for selectively and detachably holding different entering parts in the seat and recesses.

7. A device of the kind described comprising a mounting having side walls and an outer wall joining the side walls, said outer wall having a portion formed to provide a curved seat, a housing secured to the mounting, recesses provided in the side walls of the housing, a member movable in the housing and provided with a pair of locking components, one of said components serving to detachably hold an entering part on the seat, and the other component serving to detachably hold a different entering part in the recesses after the entering part on the seat is removed.

8. Means for detachably connecting a wiper blade unit and a wiper arm unit, said means comprising a mounting carried by one of the units, said mounting having a base wall provided with a seat adapted to engage a bent entering part on the other unit, said mounting also being provided with a pair of outwardly extending walls having abutment means thereon spaced from the seat for engaging a different form of entering part, and an element movable in the space between the seat and abutment means and provided with a pair of locking components for selectively detachably holding either of such entering parts in relation to the seat and abutment means.

9. A device of the kind described comprising a mounting provided with an outer wall having a curved seat inset therefrom for receiving a bent entering part of a wiper arm, a housing secured to the mounting, said housing having an opening therein overlying the seat for receiving a different kind of entering part, and manually operable means having a pair of locking components movable in unison for selectively detachably holding either of such entering parts in relation to the seat and opening.

10. A connector for attaching a wiper assembly to one of a plurality of differently constructed supporting arms including: a housing adapted to be secured to the assembly and having arm-receiving openings, each opening being adapted to receive one of said differently constructed supporting arms, a latch member substantially within the housing adapted for movement longitudinally thereof to locking and unlocking positions with respect to each of said arm-receiving openings, and means to urge the latch member toward the locking position.

11. A connector for attaching a wiper assembly to one of a plurality of differently constructed supporting arms including: a housing adapted to be secured to the assembly, a latch member substantially within the housing adapted for reciprocal movement longitudinally thereof between locking and unlocking positions to define two chambers within the housing, said housing having an opening communicating with each of the chambers to permit insertion of a supporting arm in one chamber and a different arm in the other chamber, means on the latch member to hold an arm in either of the chambers when the latch member is at said locking position, and resilient means urging the latch member toward the locking position.

12. A connector for attaching a wiper assembly to one of a plurality of differently constructed supporting arms including: a housing adapted to be secured to the assembly and having an opening at one end and another opening in a wall disposed overlying away from the assembly through each of which openings one of said differently constructed supporting arms may be received, a plate member substantially within the housing adapted for longitudinal reciprocal movement thereof between unlocking and locking positions, spaced holding means on the plate member tending to respectively close said openings when said plate member is in a locking position, and resilient means within the housing urging the plate member toward the locking position.

13. A connector as claimed in claim 12 in combination with a supporting arm having an arcuately shaped end, said end entering the housing through said opening at one end thereof, and one of the holding means on the plate member for this opening of the housing serving to retain the arcuately shaped end in this opening and thereby prevent its withdrawal from the housing when the plate member is in its locking position.

14. A connector as claimed in claim 12 wherein the holding means on the plate member for said wall opening comprises a hook, in combination with a supporting arm having an end engageable with the hook, said end entering the housing through said wall opening, and said hook effecting engagement with the arm end to prevent withdrawal of the arm from the housing when the plate member is in its locking position.

15. In a wiper assembly, a connector therefor having a single movable member for attaching the assembly to one of a plurality of differently constructed supporting arms, said connector including a housing having openings, each opening being adapted to receive therethrough a differently constructed supporting arm, said single movable member being disposed substantially within the housing for longitudinal movement thereof and having a pair of latching means respectively cooperating with the housing openings, each latching means being of a configuration to engage and hold a supporting arm of a preselected type inserted through one of said openings, and means to move the single movable member to place the latching means in a locking position.

16. A connector as claimed in claim 15 wherein one latching means is an abutment member adapted to hold a supporting arm inserted into the connection.

17. A connector as claimed in claim 15 wherein one latching means is a hook alignable with an opening cooperating therewith to engage in locking relation a supporting arm inserted through said opening.

18. A device of the kind described comprising a mounting having an outer wall provided with a curved rigid seat for receiving and engaging a bent entering part of a windshield wiper arm, a housing carried by said mounting and provided with an opening through which the entering part can be inserted for disposition in the seat, and manually operable means for releasably holding the entering part in the seat.

19. A windshield wiper assembly comprising a blade unit, an elongate bridge and an elongate connector secured to the bridge, said unit comprising an elongate support and a resilient wiper element having an attaching part secured to the support and also having a wiping part, said bridge having means adjacent its ends supported against the attaching part, said connector being considerably shorter in length than the bridge and comprising a channel having side walls, abutment means provided within the confines of the side walls, means movable between the side walls and provided with a pair of locking components, one of said components serving to detachably hold one type of an entering part in relation to the abutment means and the other component serving to detachably hold a different type of an entering part in relation to the connector after the first-mentioned entering part is removed from the abutment means.

20. A device of the kind described comprising an elongate mounting constituting an element of a windshield wiper assembly, said mounting being provided with a pair of spaced openings, an elongate housing having one end secured to the mounting and its opposite end having a pair of yieldable locking projections extending through and secured in the openings, said housing having arm-receiving openings, each of said openings being adapted to receive one of differently constructed supporting arms, a latch disposed substantially within the housing adapted for movement longitudinally thereof to locking and unlocking positions with respect to each of said openings, and means for urging the latch toward the locking position.

21. A connector for a windshield wiper comprising a mounting provided with an outer wall and side walls, said outer wall being formed with a portion inturned between the side walls to provide a rigid seat for slidably receiving an entering part, a housing secured to the mounting in overlying relation to the seat and provided with an opening through which the entering part can be inserted for disposition on the seat, and means for detachably locking such part for free sliding movement on the seat.

22. A connector for a windshield wiper comprising an elongate mounting provided with an outer wall and side walls, said outer wall being formed with a portion inturned between the side walls to provide a curved rigid seat for slidably receiving a curved entering part, a housing secured to the mounting in overlying relation to the seat, and yieldable means substantially arranged for movement in the housing for detachably locking such a part for free sliding movement in the seat.

23. A connector for a windshield wiper comprising a mounting having an outer wall provided with a curved rigid seat for receiving and engaging a bent entering part having an abutment thereon, a housing carried by said mounting and provided with an opening through which the entering part can be inserted for disposition in the seat, and manually operable means having an abutment arranged for engagement by the abutment on the entering part to releasably lock the part for free sliding movement in the seat.

References Cited in the file of this patent

UNITED STATES PATENTS

| | | |
|---|---|---|
| 2,156,506 | Marcolivio | May 2, 1939 |
| 2,276,556 | Zaiger | Mar. 17, 1942 |
| 2,432,691 | Smulski | Dec. 16, 1947 |
| 2,632,909 | Krohm | Mar. 31, 1953 |
| 2,632,910 | Anderson | Mar. 31, 1953 |
| 2,643,410 | Nesson | June 30, 1953 |
| 2,649,605 | Scinta et al. | Aug. 25, 1953 |
| 2,679,066 | Nesson | May 25, 1954 |
| 2,685,101 | Bell | Aug. 3, 1954 |
| 2,703,901 | Nesson | Mar. 15, 1955 |
| 2,709,825 | Nesson | June 7, 1955 |
| 2,806,241 | Oishei | Sept. 17, 1957 |

UNITED STATES PATENT OFFICE
CERTIFICATION OF CORRECTION

Patent No. 2,965,915                           December 27, 1960

Fred A. Krohm

It is hereby certified that error appears in the above numbered patent requiring correction and that the said Letters Patent should read as corrected below.

Column 1, line 45, for "lockng" read -- locking --; column 7, line 27, for "connection" read -- connector --.

Signed and sealed this 25th day of July 1961.

(SEAL)
Attest:

ERNEST W. SWIDER                             DAVID L. LADD
Attesting Officer                               Commissioner of Patents